US011840846B2

(12) United States Patent
Boo (10) Patent No.: US 11,840,846 B2
(45) Date of Patent: Dec. 12, 2023

(54) MINERAL-BASED PANEL

(71) Applicant: Välinge Innovation AB, Viken (SE)

(72) Inventor: Christian Boo, Kågeröd (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/318,232

(22) Filed: May 12, 2021

(65) Prior Publication Data

US 2021/0355688 A1    Nov. 18, 2021

(30) Foreign Application Priority Data

May 12, 2020   (SE) .................................... 2050554-1

(51) Int. Cl.
*E04F 15/08* (2006.01)
*B32B 3/06* (2006.01)
(Continued)

(52) U.S. Cl.
CPC .......... *E04F 15/02038* (2013.01); *B32B 3/06* (2013.01); *B32B 13/10* (2013.01);
(Continued)

(58) Field of Classification Search
CPC ................ E04F 15/02038; E04F 15/08; E04F 2201/0153; E04F 2201/023;
(Continued)

(56) References Cited

U.S. PATENT DOCUMENTS

2005/0138881 A1   6/2005  Pervan
2013/0014463 A1*  1/2013  Pervan .................. E04F 15/107
                                                              52/582.2
(Continued)

FOREIGN PATENT DOCUMENTS

EP    1 561 879 A2   8/2005
EP    3 115 195 A1   1/2017
(Continued)

OTHER PUBLICATIONS

U.S. Appl. No. 17/345,586, Christoffer Nilsson, Per Josefsson, Christian Boo, filed Jun. 11, 2021 (Cited herein as US Patent Application Publication No. 2021/0388623 A1 of Dec. 16, 2021).
(Continued)

*Primary Examiner* — Phi D A
(74) *Attorney, Agent, or Firm* — Boone IP Law (57) ABSTRACT

A mineral-based panel including a core, wherein the panel includes a mechanical locking system at respective opposite first and second edges, for assembling a first panel in an assembled position with an adjacent second panel by means of a folding displacement and/or a vertical displacement of the adjacent panels; the first edge including a locking strip projecting beyond a vertical plane and a locking element projecting from the locking strip; the second edge including a downwardly open locking groove configured to receive the locking element by for horizontal locking of the adjacent panels, wherein a first pair of horizontal locking surfaces includes a first locking surface provided by the locking element and a second locking surface provided by the locking groove. The locking system has play between the first locking surface and the second locking surface during assembling of the first and second panel by means of said displacement.

21 Claims, 7 Drawing Sheets

(51) Int. Cl.
  *E04F 15/02* (2006.01)
  *B32B 13/12* (2006.01)
  *B32B 13/10* (2006.01)
(52) U.S. Cl.
  CPC .............. *B32B 13/12* (2013.01); *E04F 15/08* (2013.01); *B32B 2471/00* (2013.01); *E04F 2201/0153* (2013.01); *E04F 2201/023* (2013.01); *E04F 2201/043* (2013.01); *E04F 2201/044* (2013.01)
(58) Field of Classification Search
  CPC .......... E04F 2201/043; E04F 2201/044; B32B 3/06; B32B 13/10; B32B 13/12; B32B 2471/00; B32B 2479/00; B32B 5/022; B32B 9/002; B32B 9/04; B32B 13/04; B32B 13/06; B32B 2419/00; B32B 2419/04; B32B 2607/00; B32B 5/024; B32B 13/08; B32B 13/14; B32B 15/02; B32B 15/18
  See application file for complete search history.

(56) References Cited

U.S. PATENT DOCUMENTS

| | | | |
|---|---|---|---|
| 2014/0000197 A1* | 1/2014 | Pervan | .................. E04F 15/102 52/309.1 |
| 2017/0335573 A1 | 11/2017 | Segaert et al. | |
| 2019/0145108 A1* | 5/2019 | Hannig | ............. E04F 15/02038 52/582.2 |
| 2020/0141130 A1 | 5/2020 | Patki et al. | |
| 2020/0308846 A1* | 10/2020 | Josefsson | ............ E04F 13/0866 |
| 2021/0310256 A1* | 10/2021 | Boo | ....................... E04F 15/102 |
| 2021/0387436 A1 | 12/2021 | Nilsson et al. | |
| 2021/0388623 A1 | 12/2021 | Nilsson et al. | |
| 2022/0090391 A1 | 3/2022 | Nilsson | |

FOREIGN PATENT DOCUMENTS

| | | | | |
|---|---|---|---|---|
| EP | 2960397 B1 * | 7/2019 | ............. | B32B 37/12 |
| WO | WO 2009/065769 A2 | 5/2009 | | |
| WO | WO 2009/065769 A3 | 5/2009 | | |
| WO | WO-2022096712 A1 * | 5/2022 | | |

OTHER PUBLICATIONS

U.S. Appl. No. 17/345,420 Christoffer Nilsson, Per Josefsson, Christian Boo, filed Jun. 11, 2021 (Cited herein as US Patent Application Publication No. 2021/0387436 A1 of Dec. 16, 2021).
U.S. Appl. No. 17/480,592 Christoffer Nilsson, filed Sep. 21, 2021 (Cited herein as US Patent Application Publication No. 2022/0090391 A1 of Mar. 24, 2022).
Office Action and Search Report issued in SE2050554-1, dated Oct. 16, 2020, PRV, Stockholm, SE, 8 pages.
International Search Report and Written Opinion issued in PCT/SE2021/050458, dated Jun. 16, 2021, Patent-och Registreringsverket, Stockholm, SE, 12 pages.

* cited by examiner

MINERAL-BASED PANEL

CROSS REFERENCE TO RELATED APPLICATIONS

The present application claims the benefit of Swedish Application No. 2050554-1, filed on May 12, 2020. The entire contents of Swedish Application No. 2050554-1 are hereby incorporated herein by reference in their entirety.

TECHNICAL FIELD

The disclosure generally relates to a mineral-based panel. More specifically, the disclosure relates to a mineral-based panel comprising a mineral-based core. The panel may comprise a locking system on at least one edge portion of the panel, preferably on two opposite edge portions of the panel. The disclosure also relates to a locking system in a mineral-based panel comprising a mineral-based core.

BACKGROUND

There is an increased demand for boards, such as floor boards, that are sustainable and in particular recyclable. There is also a need for fire resistant and water resistant boards, especially those that may maintain or even improve the properties that typically are associated with the boards, such as their dimensional stability under temperature variations of the ambient temperature and/or under moisture variations and, optionally, their flexibility.

Examples of such boards are magnesium oxide boards and cement boards or fibre cement boards. For example, a magnesium oxide board may have a layer structure attached thereto, such as comprising HPL panel.

However, such boards are still typically relatively brittle and there is need for improvements. Moreover, there is need for more robust locking systems for such, and similar, boards.

SUMMARY

It is therefore an object of at least embodiments of the present inventive concept to provide a mineral-based panel having a locking system adapted to the properties of the mineral material.

At least some of these and other objects and advantages that will be apparent from the description have been achieved by the various aspects described below.

Known locking systems commonly features biased horizontal locking wherein one or more members of the locking system is resilient or is able to flex or be compressed. Thereby, horizontal locking surfaces may be allowed to overlap during assembling with reduced risk of breaking an aspect of the lock.

Known panels may also have a horizontal play in a horizontal locking position, however during assembling it functions by one or more members being able to flex or be compressed, as explained above, this is necessary because the locking surfaces overlap during assembling.

In accordance with a first aspect of the inventive concept, there is provided a mineral-based panel, such as a floor panel, comprising a core which preferably comprises magnesium oxide. The panel comprises a mechanical locking system at respective opposite first and second edges, such as long edges, for assembling a first panel in an assembled position with an adjacent second panel by means of a folding displacement and/or a vertical displacement of the adjacent panels. Immediately juxtaposed upper edge portions of the first edge of the first panel and the second edge of the second panel in the assembled position form a vertical plane. The first edge comprising a locking strip projecting beyond the vertical plane and a locking element projecting from the locking strip. The second edge comprising a downwards open locking groove configured to receive the locking element by means of said displacement for horizontal locking of the adjacent panels. A first pair of horizontal locking surfaces comprises a first locking surface provided by the locking element and a second locking surface provided by the locking groove. The locking system is configured such that there is provided play between at least a portion of the first locking surface and at least a portion of the second locking surface during assembling of the first and second panel by means of the displacement. Thereby, flexing and/or compression of the locking element and/or locking strip may be avoided.

In one embodiment, the said play between at least a portion of the first locking surface and at least a portion of the second locking surface during assembling is defined between a predetermined trajectory of a point on the second locking surface and the first locking surface, as will be further elucidated herein.

The locking system may be configured such that there is provided play between at least a portion of the first locking surface and at least a portion of the second locking surfaces in locking position.

In one embodiment, one of the first or second edge may comprise a locking tongue and the other of the first or second edge comprises a tongue groove. The locking system may be configured such that the locking tongue is received in the tongue groove of the second edge by means of a folding displacement and/or a vertical displacement, commonly referred to as vertical folding, of the adjacent second panel, for vertical locking of first edge and the second edge, such as vertical displacement of the second edge of the second panel relative the first edge of the first edge of the first panel.

During said assembling, the upper edge portions may be simultaneously in contact in a first contact point and/or an upper wall portion of the tongue groove and an upper portion of the locking tongue are simultaneously in contact in a second contact point.

In one embodiment, a locking angle may be formed between the first locking surface and a rear surface of the panel, said locking angle preferably measured in a clockwise direction from the plane of the locking surface, the locking angle being in the range of 40 to 60 degrees, preferably 45 to 55 degrees, more preferably 48 to 52 degrees, such as 50 degrees.

In assembled position of the first and second panels, there may be provided a play between the first locking surface and the second locking surface, preferably the play in in the range of 0 to 0.1 mm, for example measured along a horizontal plane.

In one embodiment, the locking angle is adapted to allow assembling by means of said folding displacement without flexing or compression of the locking strip and/or the locking element.

The mineral-based panel may further comprise a lower arrangement comprising one or more layers, and an upper arrangement comprising one or more layers.

In one embodiment, the locking strip is formed in one of a mineral-based layer of the panel or in the core of the panel.

The locking element may be formed as an integral part of the locking strip.

In one embodiment, a point on the second locking surface is displaced along a predetermined or projected trajectory from a first space position to a second space position in response to a folding displacement of the second panel to said assembled position, such as folding of the second panel about the second edge, wherein said predetermined trajectory is disposed on one side, preferably entirely on one side, of a datum plane of the first locking surface during the folding displacement wherein at least one of a first contact point and a second contact point and a third contact point may be in contact.

In one embodiment, the predetermined trajectory forms an arc of a circle having a contact point between two adjacent edges as pivot point.

The first contact point may be between at least a portion of respective upper edge portions of the first and second panel. The second contact point may be between a second pair of vertical locking surfaces.

In one embodiment, one or more of the core and the mineral-based layer comprises non-hydraulic cement, preferably magnesium oxide, and optionally magnesium chloride, such as $MgCl_2$ and/or magnesium sulphate, such as $MgSO_4$.

The panel may comprise a front side and a rear side. The front side may be a visible side of the panel and the rear side may be concealed in an installed state of the panel, such as facing a subfloor, a subroof or a subwall.

A thickness of the panel may be 2-40 mm, such as 4-12 mm or 2-10 mm. For example, a floor panel may have a thickness of 2-10 mm. A groove length of each groove may be larger than 5 mm, preferably larger than 50 mm.

The mineral-based panel may be a cementitious panel comprising cement. For example, the mineral-based core, or core for short, may be a cementitious core.

The cementitious panel or core may comprise non-hydraulic cement. The non-hydraulic cement may comprise magnesium oxide, and optionally magnesium chloride (e.g., $MgCl_2$) and/or magnesium sulphate (e.g., $MgSO_4$). For example, the non-hydraulic cement may comprise or may be Sorel cement.

The cementitious panel or core may comprise hydraulic cement. The hydraulic cement may comprise silicates, such as calcium silicates, and optionally oxides. For example, the cement may be fibre cement, such as comprising or being Portland cement.

The mineral-based core may comprise magnesium oxide and, optionally, magnesium chloride and/or magnesium sulphate.

The mineral-based core may comprise gypsum or may be a gypsum board. This may be particularly advantageous for a wall panel or a ceiling panel.

The mineral-based core may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

Generally, the core may further comprise at least one selected from the group of a filler, such as an organic and/or inorganic filler, additive(s) and a binding agent. The filler may be a functional filler. For example, the functional filler may reinforce the core, improve the bonding to a, preferably inorganic, matrix material of the core, increase a rigidity of the core, etc.

The core may comprise organic material, such as at least one selected from the group of wood fibres, cellulose fibres, natural fibres, carbon fibres, and bamboo.

The core may comprise inorganic material, such as calcium carbonate, fly ash, silica, or perlite.

The mineral-based core may comprise cement.

The mineral-based core may comprise reinforcing material, such as fibre reinforcement. The fibre reinforcement may be organic, such as comprising cellulose fibres or wood fibres, or inorganic, such as comprising glass fibres.

The mineral-based core may be a cement board, such as a fibre cement board.

Generally, a density of the mineral-based core, for example comprising magnesium oxide or cement, may be between 1000 and 2000 $kg/m^3$, such as between 1200 and 1700 $kg/m^3$. A larger density may provide a larger rigidity and/or a larger flexural rigidity of the core.

The mineral-based panel may further comprise a lower arrangement comprising at least one lower layer which is attached to a lower side of the mineral-based core.

At least two lower layers may be attached together by means of an adhesive or may be laminated together, or a combination thereof. The adhesive may be compatible with the materials of the attached layers.

In a first example, the lower arrangement may be attached to the core by means of an adhesive. In a second example, the lower arrangement may be laminated to the core.

The lower arrangement may comprise a backing layer, which preferably is a bottommost layer of the lower arrangement. The backing layer may impact the balancing properties and/or the stability of the panel.

The material content of any, some or each lower layer may be the same as in the core, whereby reference is made to the above.

In any of the embodiments herein, a density of at least one lower layer, such as all lower layers, in the lower arrangement may be larger than a density of the mineral-based core. Generally, the density may be between 1100 and 2100 $kg/m^3$, such as between 1300 and 1400 $kg/m^3$.

At least one lower layer in the lower arrangement may comprise magnesium oxide and, optionally, magnesium chloride and/or magnesium sulphate. Each such lower layer may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

At least one lower layer in the lower arrangement, preferably all lower layers, may comprise cement.

The at least one lower layer may be a cement board, such as a fibre cement board.

The lower arrangement may comprise at least one polymer-based layer, such as at least one thermoplastic layer, for example comprising polyvinyl chloride (PVC), polyethylene (PE), thermoplastic polyurethane (TPU), polypropylene (PP), polyethylene terephthalate (PET), polyolefin copolymers or acrylonitrile butadiene styrene (ABS), or at least one thermosetting layer, for example comprising a melamine-formaldehyde resin, or melamine resin for short, epoxy resin, preferably crosslinked with an amine hardener, polyurethane (PU), polyurea or acrylate polymers.

The lower arrangement may comprise at least one wood-based layer or cellulose-based layer, such as a veneer, paper, such as impregnated paper, preferably paper impregnated with a melamine resin, solid wood layer, MDF layer, HDF layer, layer of Direct Pressure Laminate (DPL) or High Pressure Laminate (HPL), or particle board layer.

The mineral-based panel may further comprise an upper arrangement comprising at least one upper layer and which is attached to an upper side of the mineral-based core.

At least two upper layers may be attached together by means of an adhesive or may be laminated together, or a combination thereof. The adhesive may be compatible with the materials of the attached layers.

In a first example, the upper arrangement may be attached to the core by means of an adhesive. In a second example, the upper arrangement may be laminated to the core.

In any of the embodiments and examples herein, the adhesive attaching a first structure to a second structure, may be a polyurethane, silane-terminated epoxy resin, or silane-terminated polyurethane. Any of these may be two-component. Moreover, the adhesive may be a non-reactive or reactive hot-melt adhesive, for example being based on polyurethane or polyolefin. More generally, the adhesive may be a two-component adhesive. Preferably, the adhesive is moisture resistant and/or heat resistant.

The material content of any, some or each upper layer may be the same as in the core, whereby reference is made to the above.

In any of the embodiments herein, a density of at least one upper layer, such as all upper layers, in the upper arrangement may be larger than a density of the mineral-based core. Generally, the density may be between 1100 and 2100 kg/m$^3$, such as between 1300 and 1400 kg/m$^3$.

At least one upper layer in the upper arrangement may comprise magnesium oxide and, optionally, magnesium chloride and/or magnesium sulphate. Each such upper layer may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

At least one upper layer in the upper arrangement, preferably all upper layers, may comprise cement.

The at least one upper layer may be a cement board, such as a fibre cement board.

The upper arrangement may comprise at least one polymer-based layer, such as at least one thermoplastic layer, for example comprising PVC, PE, TPU, PP, PET or ABS, or at least one thermosetting layer, for example comprising a melamine-formaldehyde resin, epoxy resin, preferably crosslinked with an amine hardener, PU, polyurea or acrylate polymers.

The upper arrangement may comprise at least one wood-based layer or cellulose-based layer, such as a veneer, paper, such as impregnated paper, preferably paper impregnated with a melamine resin, solid wood layer, MDF layer, HDF layer, or particle board layer.

The at least one polymer-based layer of the upper and/or lower arrangement(s) may comprise plasticized and/or flexible layer(s), such as being a Luxury Vinyl Tile (LVT) panel or an LVT sheet. Alternatively, the at least one polymer-based layer of the upper and/or lower arrangement(s) may comprise rigid layer(s), such as being a Stone Plastic (Polymer) Composite (SPC) panel or an SPC sheet.

The at least one polymer-based layer of the upper and/or lower arrangement(s) may be a powder-based layer comprising a thermosetting resin, optionally further comprising at least one veneer layer.

The at least one wood-based or cellulose-based layer of the upper and/or lower arrangement(s) may be a high-pressure laminate (HPL) panel.

The at least one wood-based or cellulose-based layer of the upper and/or lower arrangement(s) may be a powder-based separate surface layer (SSL) as described in WO 2009/065769 A2. For example, the SSL layer may have a thickness of about 0.3-3.0 mm. The surface layer may have a high density and impact resistance even if it is combined with rather soft core materials.

In some embodiments, the upper arrangement may comprise at least one ceramic tile, for example attached to a carrier layer of the upper arrangement or to the core by an adhesive.

The upper arrangement and/or the lower arrangement(s) may be rigid. For example, the upper arrangement and/or the lower arrangement(s) may be more rigid than the core.

At least one upper and/or lower layer may comprise a filler. The filler may be a filler, such as a functional filler, in complete analogy with any of the embodiments of the filler of the core described elsewhere herein.

The upper arrangement and/or the lower arrangement(s) may be soft. For example, the upper arrangement and/or the lower arrangement may be softer than the core. In any embodiment of the upper and/or lower arrangement(s), any, some or all lower and/or upper layer(s) may comprise a plasticizer. This may be particularly relevant for thermoplastic layers. If so, an adhesive which is compatible with a plasticizer may be preferred.

The mineral-based panel may further comprise at least one reinforcement layer, such as a glass-fibre layer. Generally, at least one woven or nonwoven reinforcement layer may be used.

The at least one reinforcement layer may be a metal-based layer, such as a mesh, for example comprising steel. This may be particularly advantageous for a panel, such as a core, comprising cement.

The at least one reinforcement layer may be provided in the mineral-based core, for example in a centre portion of the core.

At least one reinforcement layer may be positioned in a top portion and/or a bottom portion of the mineral-based core. In a first example, at least one reinforcement layer may be positioned a distance from an upper and/or a lower side of the core which is less than ⅙, preferably less than ⅛, more preferably less than 1/16, of a thickness of the core. In a second example, at least one reinforcement layer may be positioned a distance from an upper and/or a lower side of the core which is less than 2 mm, such as less than 1 mm. A thickness of the core may be 2-40 mm, such as 4-12 mm or 2-10 mm. In a third example, at least one reinforcement layer may be positioned essentially at the upper and/or lower side of the core.

In any embodiment herein, one or more of the core 3, a mineral-based layer of the upper arrangement 5, a mineral-based layer of the lower arrangement 6 may comprise at least 30 wt % magnesium oxide, and, optionally, magnesium chloride and/or magnesium sulphate. For example, the core 3 may comprise 35-55 wt % magnesium oxide and, optionally, 15-35 wt % magnesium chloride and/or magnesium sulphate. Optionally, the core may further comprise a filler, such as fly ash or calcium carbonate, preferably in an amount of 0-40 wt %, and/or a binding agent, such as wood shavings or wood dust, preferably in an amount of 0-10 wt %. More generally, the core 3 may comprise an inorganic matrix material, preferably with at least 20 wt % of an inorganic matrix material, such as cement, such as hydraulic or non-hydraulic cement, or gypsum.

In accordance with a second aspect of the inventive concept, there is provided a set of panels comprising a plurality of panels in accordance with any of the embodiments or examples of the first aspect.

Generally, all terms used in the claims and in the items in the embodiment section below are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The disclosure will in the following be described in connection to exemplary embodiments and in greater detail with reference to the appended exemplary drawings, wherein:

FIG. 4b illustrates details of a folding displacement of the embodiment of FIG. 4a.

FIG. 5a illustrates further details of the embodiment of FIG. 4a.

FIG. 6b illustrates further details of the embodiment of FIG. 6a.

FIG. 7b illustrates details of a folding displacement of the embodiment of FIG. 7a.

DETAILED DESCRIPTION

Below, embodiments of a mineral-based panel 10 will mostly be described in the context of a floor panel, but it is understood that the panel also may be a building panel, a wall panel, a ceiling panel or a furniture panel.

Figure 1A:
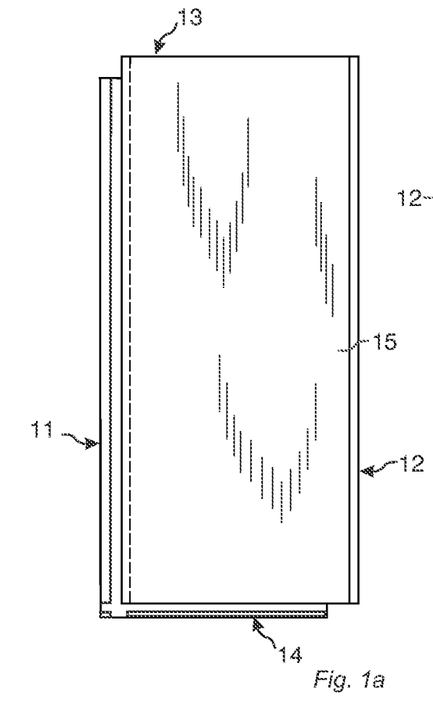
FIGS. 1a-1b schematically illustrate embodiments of a panel in a top view and in bottom views.
Figure 1B:
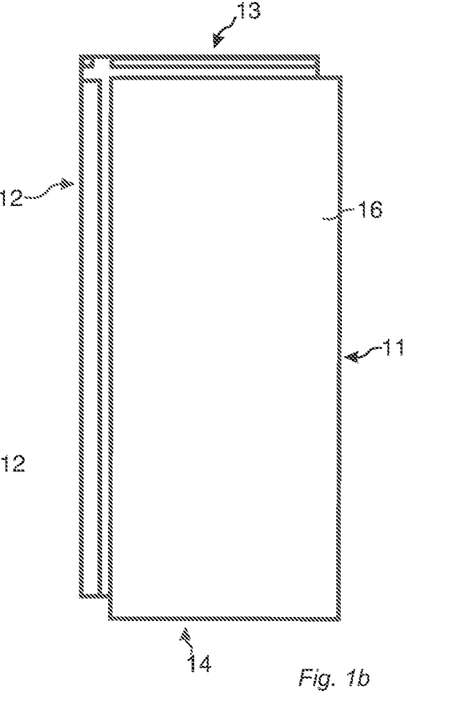

FIGS. 1a-1b show an exemplary panel according to the disclosure. Generally herein, the panel may extend in a first horizontal direction x and in a perpendicular second horizontal direction y. Moreover, the panel may extend in a vertical direction z which may be perpendicular to the first and second horizontal directions. The panel 1 may comprise a first pair of opposite edge portions 11, 12, which may be long edge portions, and a second pair of opposite edge portions 13, 14, which may be short edge portions. The long edge portions may extend along the first horizontal direction x and the short edge portions may extend along the second horizontal direction y.

Figure 2A:
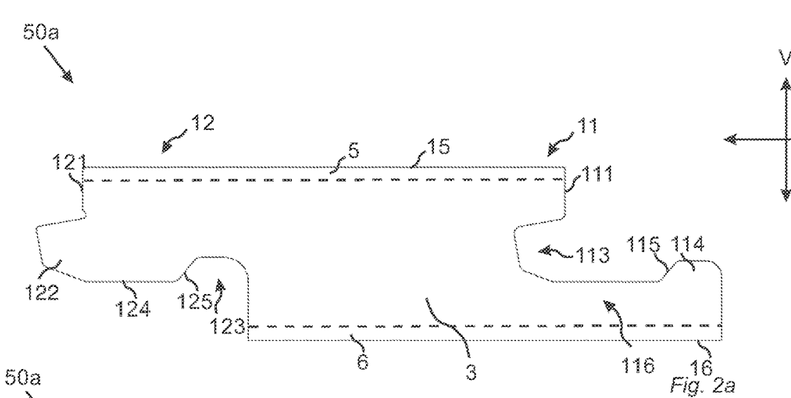
FIG. 2a illustrates an embodiment of a panel in a cross-sectional view.
Figure 2B:
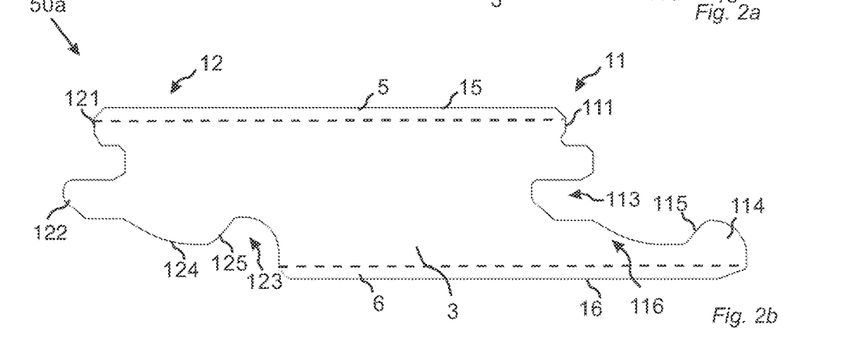
FIG. 2b illustrates an embodiment of a panel in a cross-sectional view.

The panel in any of the embodiments in FIGS. 1a-1b may comprise a first locking system 50a on the first pair 11, 12 of opposite edge portions, such as long edge portions. In one embodiment the panel 10 is provided with the first locking system 50a at the first pair of opposite edge portions 11, 12 and a second locking system 50b at the second pair of opposite edge portions 13, 14, as will be explained herein. However, the second locking system 50b may in any embodiment be provided on the first pair and/or the second pair of opposite edges. FIGS. 2a-2b show exemplary embodiments of the first locking system 50a. As shown in FIGS. 2a-2b the first locking system 50a comprises at one of the pair of opposite edge portions a locking tongue 122 configured to cooperate with a tongue groove 113 provided on the other of the opposite edge portions for vertical locking of panels in a plane. For example, the locking tongue and tongue groove may be integrally formed with the panel as shown in FIGS. 2a-2b. The locking system 50a further comprises at the said other edge of the pair of opposite edge portions a downwards open locking groove 123, configured to receive a first locking element 114 for horizontal locking of panels from parting away from each other. The first locking element 114 is provided on a first locking strip 116 projecting from a vertical plane VP which may be formed by immediately juxtaposed upper edge portions 111, 121 of the first pair of edge portions in assembled position with an adjacent panel, as shown in FIG. 4c. Thus, the locking strip 116 extends horizontally beyond an upper portion 111 of the panel 10. The first locking element 114 provided on the first locking strip 116 may extend therefrom in a vertical direction towards a plane of the front surface 15 of the panel. It should be appreciated that the locking system 50a may be provided at any pair of opposite edge portions, such as long edges and/or short edges.

Figure 6A:
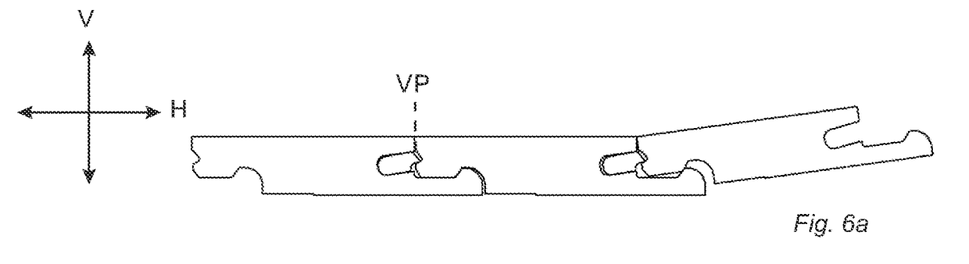
FIG. 6a illustrates an exemplary assembling process of a set of panels according to the embodiment of FIG. 3.
Figure 6B:
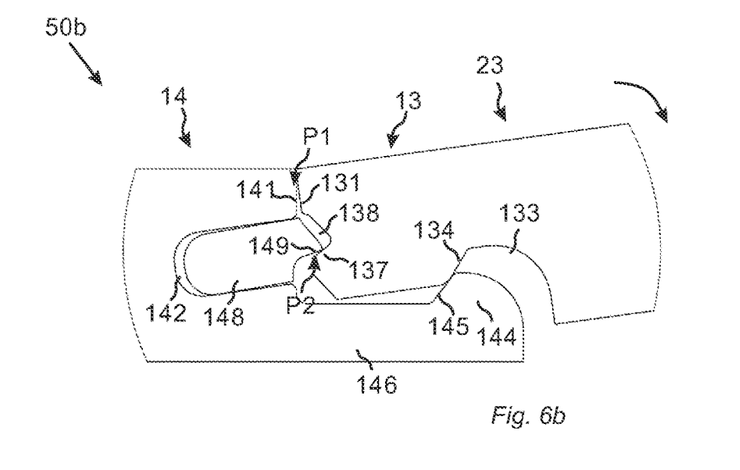
Figure 6C:
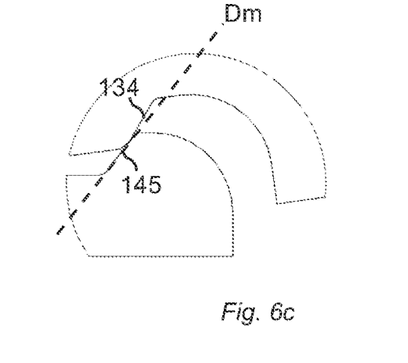
FIG. 6c illustrates details of the embodiment of FIG. 6a during locking.

FIGS. 3 and 6a-6d show exemplary embodiments of the second locking system 50b. As shown in FIGS. 3 and 6a-6d the second locking system 50b comprises at one of the second pair of opposite edge portions 13, 14 a locking tongue 148 configured to cooperate with a second tongue groove 138 provided on the other of the second pair of opposite edge portions for vertical locking of panels in a plane. For example, and as shown in FIG. 6b, the tongue 148 may be a separate locking tongue 148 provided in a displacement groove 142, preferably facilitating a fold down locking system. A non-limiting embodiment of a separate locking tongue 142 is illustrated in FIG. 6b in a cross-sectional top view. This so-called bristle tongue is preferably formed in one-piece and comprises flexible protrusions. The locking tongue 148 may be configured to displace in the displacement groove 142 between a locking position and an unlocking position. The second tongue groove 138 may be integrally formed with the panel, such in the core of the panel. The second locking system 50b further comprises at the said other edge of the pair of opposite edge portions a downwards open second locking groove 133, configured to receive a second locking element 144 by means of a folding displacement or a vertical displacement of the edge portion comprising the second locking groove 133, for horizontal locking of panels from parting away from each other in the assembled position of the panels. The second locking element 114 is provided on a second locking strip 146 projecting from a second vertical plane VP2 which may be formed by immediately juxtaposed upper edge portions 131, 141 of the second pair of edge portions in assembled position with an adjacent panel, as shown in FIG. 6a. Thus, the second locking strip 146 extends horizontally beyond an upper portion 141 of the panel 10. The second locking element 144 provided on the second locking strip 146 may extend therefrom in a vertical direction towards a plane of the front surface 15 of the panel.

The core 3 may be mineral-based and may in some embodiments comprise reinforcing material, such as fibre reinforcement. The fibre reinforcement may be organic, such as comprising cellulose fibres or wood fibres, or inorganic, such as comprising glass fibres.

The mineral-based panel may further comprise a lower arrangement 6 comprising at least one lower layer which is attached to a lower side of the core 3. The lower arrangement may comprise a mineral-based layer.

The mineral-based panel may further comprise an upper arrangement 5 comprising at least one lower layer which is attached to a lower side of the mineral-based core. The upper arrangement may comprise a mineral-based layer.

Figure 3:
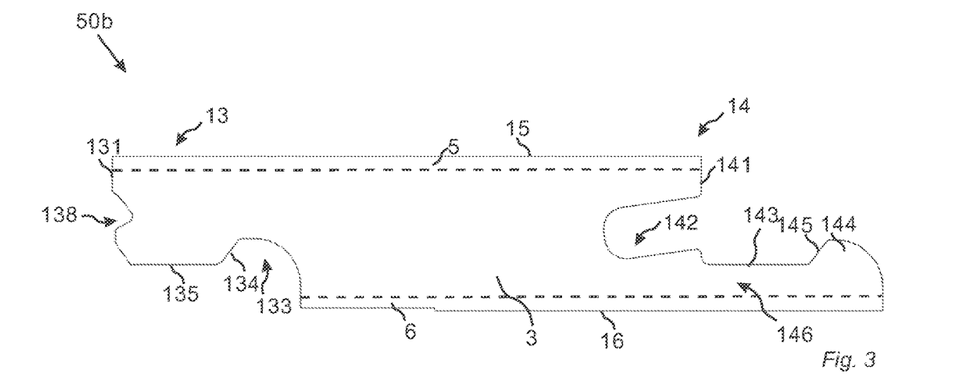
FIG. 3 illustrates an embodiment of a panel in a cross-sectional view.
Figure 8A:
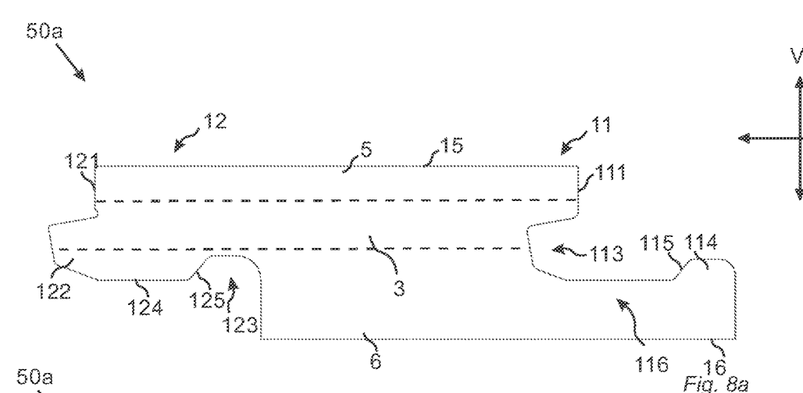
FIG. 8a is schematic illustration of an embodiment corresponding to FIG. 2a wherein the locking system is at least partially formed in a mineral-based layer.
Figure 8B:
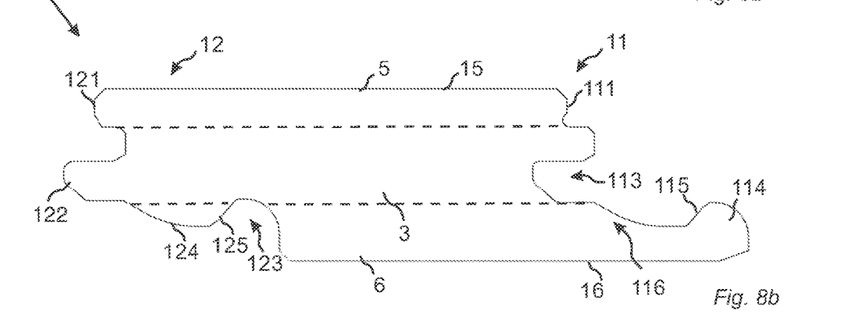
FIG. 8b is schematic illustration of an embodiment corresponding to FIG. 2b wherein the locking system is at least partially formed in a mineral-based layer.
Figure 8C:
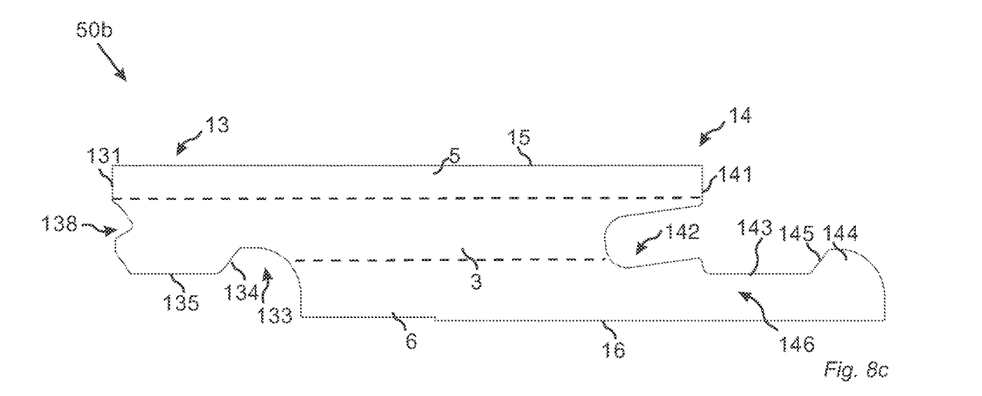
FIG. 8c is schematic illustration of an embodiment corresponding to FIG. 3 wherein the locking system is at least partially formed in a mineral-based layer.

The locking systems 50a, 50b may be at least partially formed in the core 3 between the upper arrangement 5 and the lower arrangement 6, as shown in FIGS. 2a-2b and 3. In particular, a first and second pair of horizontal locking surfaces 111, 121 and 125, 115 respectively may be formed in the core 3, for example by means of machining, such as rotating tools. Alternatively or additionally, at least part of the locking systems 50a, 50b may be formed in a mineral-based layer of the upper arrangement 5 and the lower arrangement 6, as schematically shown in the embodiments of FIGS. 8a-8c. In particular, the second pair of horizontal locking surfaces 125, 115 may be formed in such mineral-based layer. For example, a portion of the locking strip 116 including the upper surface 118 of the locking strip and the locking element 114 may be formed in a mineral-based layer, such as the core or a mineral-based layer of the lower-arrangement 6. For example, the first locking tongue 122 and the first tongue groove 113 may be formed in a mineral-based layer, such as the core 3 or a mineral-based layer of the upper-arrangement 5. In a still further example, the second tongue groove 138 and at least part of the displacement groove 142 may be formed in a mineral-based layer, such as the core 3 or a mineral-based layer of the upper-arrangement 5.

A horizontal extension of the first locking tongue 122 from the vertical plane VP may be smaller than an extension of the first locking strip 116 from the vertical plane VP. A horizontal extension of the first tongue groove 113 may be substantially the same as the extension of the first locking tongue 122.

A horizontal extension of the second locking tongue 148 from the second vertical plane VP2 may be smaller than an extension of the second locking strip 146 from the second vertical plane VP2. A horizontal extension of the second tongue groove 138 may be substantially the same as the extension of the second locking tongue 148.

Referring to FIGS. 2a-2b and 3 there is illustrated exemplary embodiments of a panel 10 according to the disclosure. The panel comprises a mineral-based core 3, preferably comprising magnesium oxide, as has been explained herein.

A horizontal portion of the locking strips 116, 146 may extend along a first and/or a second horizontal direction of the mineral-based panel and may have a vertical extension, such as extending from a rear side 16 of the panel to a respective upper surface of the strip 118, 143.

The horizontal portion may comprise the entire strip 116, 146, preferably including a locking element 114, 144. At least a horizontal portion of the strip may be formed in the core 3.

The strips 116, 146 may respectively extend horizontally beyond a respective upper portion 111, 141 of the mineral-based panel.

The strips 116, 146 may comprise the locking element 114, 144 respectively as mentioned. Preferably, the horizontal portion is at least provided horizontally inwardly of the locking element 114, 144.

The locking element 114, 144 may comprise a portion of the mineral-based core, such as at a distal end portion of the locking element. The distal end portion may be a vertical distal end portion.

In the locking systems 50a, 50b, a respective first pair of cooperating horizontal locking surfaces 115, 125 and 145, 134 comprises a first locking surface 115, 145 provided by the locking element 114, 144 on an inboard side thereof, and a second locking surface 125, 134 provided by the locking groove 123, 133. The first locking surface 115, 145 may be sloping in a direction towards the upper surface of the locking strip 116, 146 to form a locking angle, as will be elucidated herein.

A respective second pair of cooperating horizontal locking surfaces 111, 121 and 131, 141 comprises an upper edge portion 111, 131 of the first edge 11 and third edge 13 and an upper edge portion 121, 141 of the second edge 12 and fourth edge 14.

In the embodiment of FIGS. 2a-2b and 4b-4c, a first pair of vertical locking surfaces comprises an upper surface portion 126 of the first locking tongue 122 and an upper wall surface portion 117 of the first tongue groove 113.

In the embodiment of FIGS. 2a, 4a-4c and 8a, a second pair of vertical locking surfaces may comprise a lower edge surface 124, of the second edge 12 and an upper surface 118 of the locking strip 116 of the first edge 11.

Figure 7A:
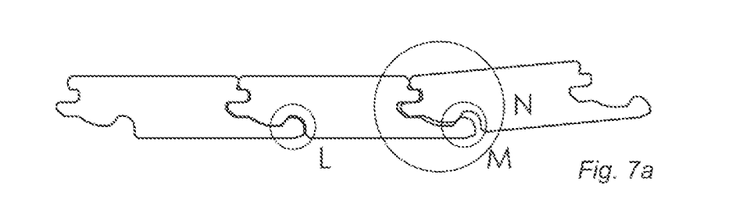
FIG. 7a illustrates an exemplary assembling process of a set of panels of FIG. 2b according to an embodiment.
Figure 7B:
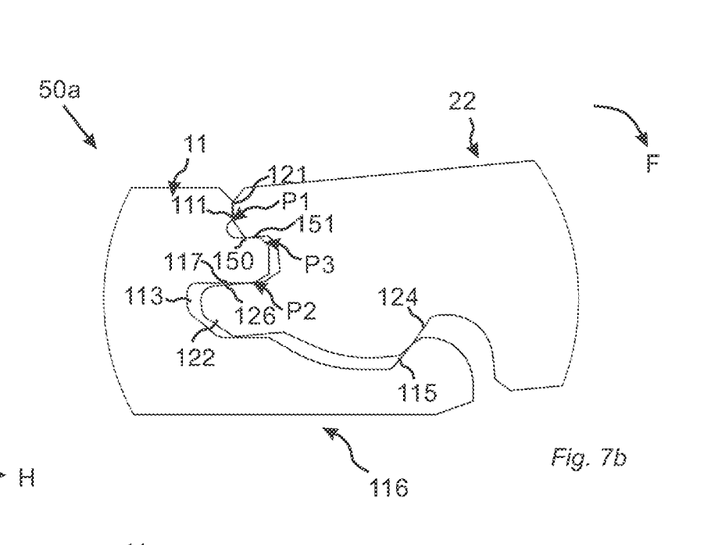

In the embodiment of FIGS. 2b, 7a-7c and 8b, a second pair of vertical locking surfaces may comprise the upper lip surface 151, of the second edge 12, 22 and a lower lip surface 150 of the first edge 11. The upper lip surface 151 may be provided by a third tongue groove provided between the first locking tongue 122 and the upper edge portion 121 of the second edge 12. The lower lip portion 150 may be provided by a third tongue groove provided between the first tongue groove 113 and the upper edge portion 111 of the first edge 11. In this embodiment, as shown in FIG. 7b, the upper lip portion 151 and the lower lip portion 150 may be in contact in the first contact point P1, the second contact point P2 and in a third contact point P3 during assembling, such as during displacement between the first position and the second position as described herein.

In the embodiment of FIGS. 3, 6b and 8c, a first pair of cooperating vertical locking surfaces comprises a lower surface portion 149 of the locking tongue 148 and a lower wall surface portion 137 of the second tongue groove 138.

A second pair of vertical locking surfaces may comprise lower a lower edge surface 135 of the third edge 13 and an upper surface 143 of the locking strip 146 of the fourth edge 14.

In any embodiment the locking system 50a, 50b may be configured at the first pair and/or the second pair of opposite edge portions with the feature of the embodiment shown in FIGS. 2b, 7a-7c and 8b, namely a respective upper and lower lip portion. Additionally, in any embodiment the upper and lower lip portions may constitute cooperating vertical locking surfaces.

It should be appreciated that the term "vertical locking surfaces" entails that the said surfaces are configured for locking in a vertical direction and likewise the term "horizontal locking surfaces" entails that the said surfaces are configured for locking in a horizontal direction.

Figure 4A:
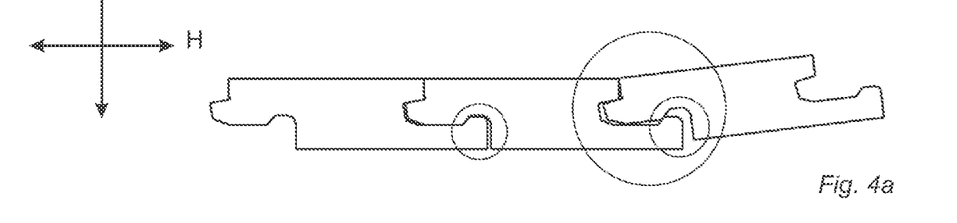
FIG. 4a illustrates an exemplary assembling process of a set of panels of FIG. 2a according to an embodiment.
Figure 4B:
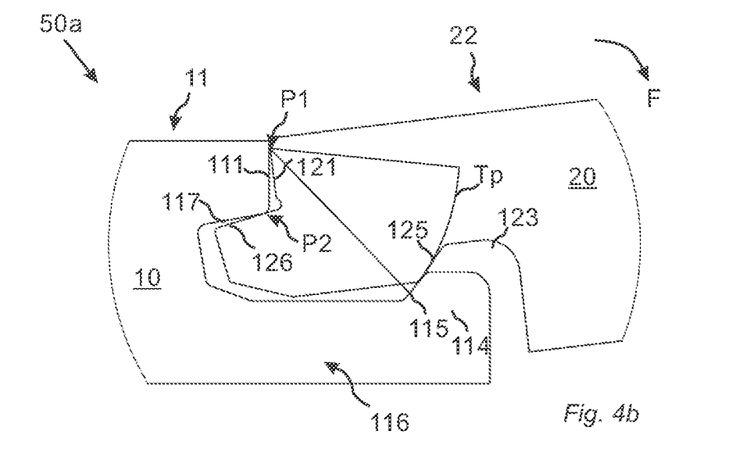
Figure 4C:
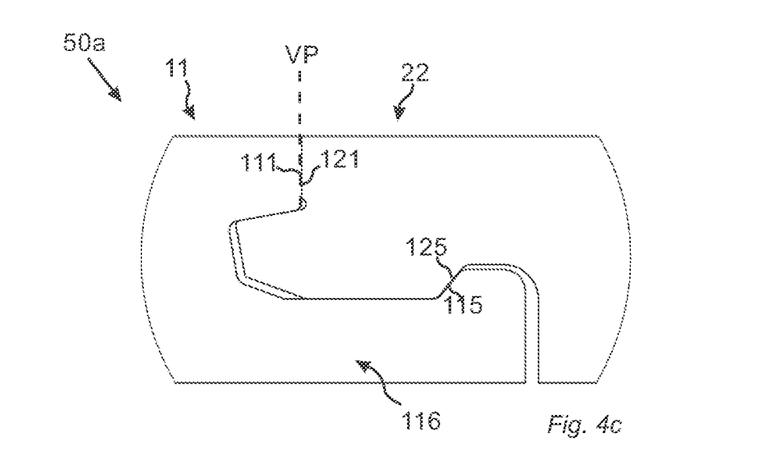
FIG. 4c illustrates of details of the embodiment of FIG. 4 in locking position.

As shown in FIG. 4b, a first contact point P1 during assembling of adjacent panels by means of a folding displacement may, in the first locking system 50a, be a point of contact between the second pair of horizontal locking surfaces, such as the upper edge portion 111 of the first edge 11 of the first panel 10 and the upper edge portion 121 of the of the second panel 20. This contact point P1 may be a pivot point of the folding displacement.

A second contact point P2 during assembling may, in the locking system 50a, be a point of contact between the first pair of vertical locking surfaces 117, 126, such as the surface of the upper wall portion 117 of the first tongue groove 113 of the first panel 10 and the upper surface portion 126 of the first locking tongue 122 of the second panel 20.

As shown in FIG. 6b a first contact point P1 during assembling of adjacent panels by means of a folding displacement may, in the locking system 50b, be a point of contact between the second pair of horizontal locking surfaces of locking system 50b, such as the upper edge portion 141 of the fourth edge 14 of the first panel 10 and the upper edge portion 131 of the of the third edge 23 of an adjacent second panel 20.

A second contact point P2 during assembling by means of a folding displacement may, in the locking system 50b, be between the first pair of vertical locking surfaces 149, 137, such as the lower surface portion 149 of the locking tongue 148 and the lower wall portion 137 of the tongue groove 138 of the third edge 13.

A third contact point P3 during assembling by means of a folding displacement may, in the first locking system 50a, be a contact point between the upper lip portion 151 and the lower lip portion 150, as shown in FIG. 7b.

Figure 7C:
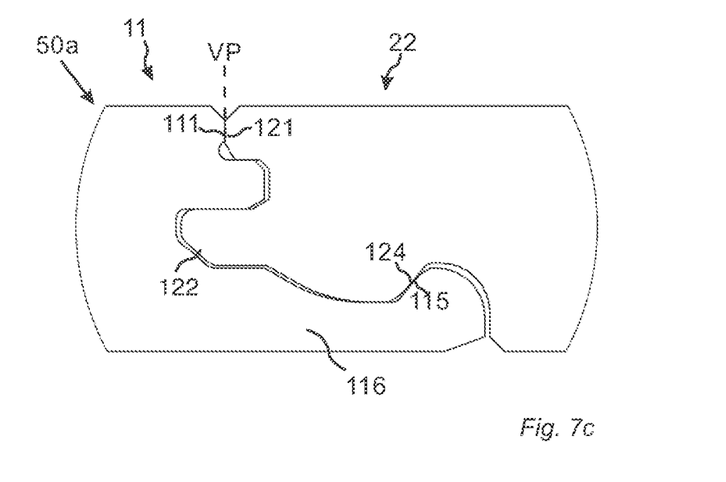
FIG. 7c illustrates of details of the embodiment of FIG. 7a in locking position.

Referring to FIGS. 7a-7c, the first edge 11 may as mentioned herein comprise a lower lip surface 150 provided between the upper edge portion 111 and the first tongue groove 113. The lower lip surface 150 may extend essentially parallel to the upper wall surface portion 117 and/or essentially perpendicular to the upper edge portion 111.

Further to FIGS. 7a-7c, the second edge 12, 22 of the panel 10 and 20 respectively, may comprise an upper lip surface 151 configured to abut the lower lip surface 150 when two panels are assembled in locking position, as shown in FIG. 7c. The lower lip portion 151 may be provided between the upper edge portion 121 and the locking tongue 122. The lower lip portion 151 may extend essentially parallel the upper surface portion 126 of the locking tongue 122 and/or essentially perpendicular the upper edge portion 121. The upper lip surface 151 may be configured to bear on the lower lip surface 150 in the assembled position.

Accordingly, the second pair of opposite edge portions 13, 14 may comprise between the second tongue groove 138 and the upper edge portion 131 one of a second upper lip portion or a second lower lip portion and between the second locking tongue 148 and the upper edge portion 141 the other of the second upper lip portion or a second lower lip portion.

According to a preferred embodiment, a locking angle LA in the first and/or second locking system 50a, 5b may be adapted to allow the folding displacement without overlapping of the first locking surface 115, 145 and the second locking surface 125, 134. For example while P1 is simultaneously in contact, more preferably while P1 and P2 are simultaneously in contact. Optionally also P3 is simultaneously in contact. The term "overlapping" may in this context imply that there is engagement between the first locking surface 115 and the second locking surface 125.

The locking system 50a may be configured such that the first locking surface 115 and second locking surfaces 125 do not overlap during assembling of the first and second panel and, preferably such that there is provided play Dt (see FIG. 5b) between the first and second locking surfaces 115, 125 of the first pair of horizontal locking surfaces in the assembled position of the first and second panels 10, 20.

Referring again to FIGS. 5b and 6d, the locking angle LA may be formed as the smaller angle between the second locking surface 125, 145 and the rear surface 16 of the panel. The locking angle LA may thus be measured in a clockwise angular direction in FIGS. 5b and 6d. The locking angle LA may preferably be in the range of 40 to 50 degrees, preferably 45 to 55 degrees, more preferably 48 to 52 degrees, such as 50 degrees.

Figure 5A:
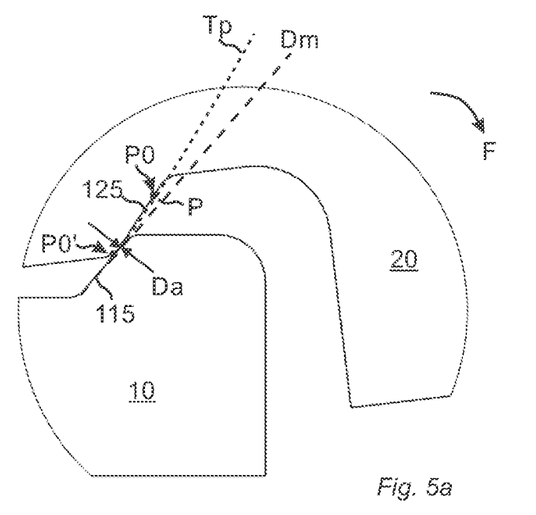
Figure 5B:
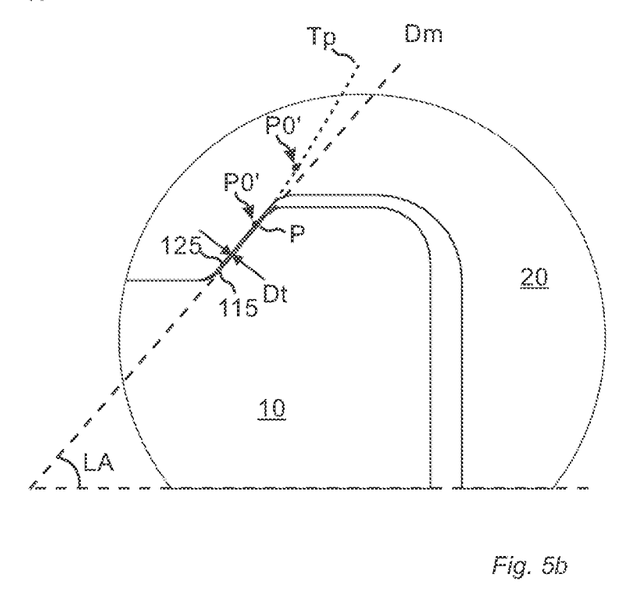
FIG. 5b illustrates further details of the embodiment of FIG. 4b.
Figure 6D:
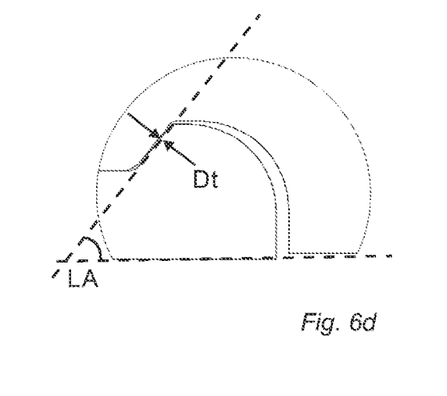
FIG. 6d illustrates details of the embodiment of FIG. 6a in locking position.

The second locking surface 125 may be configured to extend essentially parallel the first locking surface 115 in assembled position of the panels, as derivable from FIGS. 5b, 6d, 7c.

The locking system 50a and preferably 50b may be configured such that in assembled position of the first and second panels 10, 20, the play Dt (see FIGS. 5b and 6d) between the first pair of horizontal locking surfaces is in the range of 0 to 0.1 mm.

The locking angle LA may be adapted to allow the assembling by means of folding displacement F without mutual abutment or engagement of the first locking surface 115 and the second locking surface 125.

Generally, in any embodiment, the locking angle LA may be configured to allow assembling by means of the folding displacement without flexing or compression of any part of the locking system 50a, 50b. For locking system 50b, the locking angle LA may be configured to allow assembling by means of the folding displacement without flexing or compression of any part of the locking system, excepting the displaceable tongue 148, which may be displaced into the displacement groove 142 by, for example, flexing of flexible protrusions on the tongue 148. The displaceable tongue 148 may be configured to flex and/or displace into the displacement groove 142 to an extent which suffice for allowing the panels to be assembled exclusively by means of a substantially vertical displacement VF.

The locking angle LA may be adapted to allow assembling by means of the folding displacement without flexing or compression of the locking strip 116.

Accordingly, the locking angle LA may be adapted to allow assembling by means of the folding displacement without flexing or compression of the second edge 22 of the second panel as shown in FIGS. 5a-5b.

The locking angle LA may be adapted to allow assembling by means of the folding displacement without flexing or compression of the locking element 114, 144.

The locking element 114 may be formed as an integral part of the locking strip 116.

The plane of the first horizontal locking surface 115 of the first panel 10 may define a datum plane Dm.

As shown for example in FIG. 5a, according to any embodiment, there may be preferably be provided a minimum play Da between the first locking surface 115, 145 and the second locking surface 125, 134 during assembling of the first and second panel to the locking position shown in FIG. 5b. The play Da between the first pair of horizontal locking surfaces may be in the range of 0 to 0.1 mm, for example in a range of more than 0 to 0.1 mm.

In one embodiment there may be at zero or least no negative play Da between the first pair of horizontal locking surfaces 115, 125 during assembling, such as during displacement from the first position to the second assembled positon. A play Da of zero should allow the first pair of horizontal locking surfaces 115, 125 to displace past one another during assembling without requiring any flex of any parts of the locking system.

As shown for example in FIGS. 5a-5b, according to any embodiment, the play Da between the first locking surface 115, 145 and the second locking surface 125, 134 during assembling (see FIG. 5a) may be a minimum play between the first locking surface 115 and the second locking surface 125 during assembling of the first and second panel to the locking position (see FIG. 5b). The play Da may be in the range of 0 to 0.1 mm.

Referring to FIGS. 5a-5b, a point P on the second horizontal locking surface 125 may be positioned at a space position P0, such as when P1 and optionally P2 are in contact, as shown in FIG. 4b. By means of the folding displacement F, such as of the second panel 20, preferably about the second edge 22 of the second panel 20, the point P may displace according to a projected trajectory Tp to a space position P0', as illustrated in FIGS. 5a-5b.

Thus, when point P is positioned in position P0, a projected trajectory Tp of point P from position P0 to position P0' may form an arc of a circle, preferably having as P1 as pivotal point and with a radius of curvature being R1.

The projected trajectory Tp may be one or more of a projected trajectory and a predetermined trajectory.

Typically in mechanical locking systems, a datum plane corresponding to datum plane Dm is displaced during assembling by means of folding displacement i.e. under the action of force exerted by a corresponding second locking surface due to overlapping of the first and second locking surfaces. Thereby, the datum plane may be displaced during such assembling, whereby one or more of the features of the locking system is flexing, such as a corresponding locking strip.

The locking angle LA and/or the play Dt may be configured such that the said projected trajectory Tp does not cross the datum plane Dm, preferably while there is contact at contact point P1 and/or P2. The datum plane Dm may be stationary. In particular, the locking angle LA and/or Dt may be configured such that the projected trajectory Tp does not cross from one side of the datum plane Dm, such as an upper side of the first locking surface 115, 145, to the other side of the plane Dm. It should be appreciated that the above may be valid without flexing of any of the parts of the locking system 50a, 50b. Thus, point P may preferably displace along the projected trajectory from P0 to P0' without influence of the locking element 114 and in particular without influence of the first locking surface 115.

Thereby, a projected trajectory Tp of point P of the locking surface 125 from position P0 to position P0' in response to a folding displacement F of the second panel 20, such as about the second edge 22 of the second panel 20, may be disposed on one side, preferably entirely on one side, of the first locking surface 115 and/or a datum plane Dm of the first locking surface 115 during the folding displacement F while at least one of points P1, P2 and P3 are in contact. The first locking surface 115 may be stationary.

Assembling of the first and second panel 10, 20 may herein comprise a displacement in an assembling direction from a first position wherein the adjacent edges 11, 12; 13; 14 are in contact in point P1, to a second assembled position for horizontal locking of the adjacent edges by means of the first locking surface 115 and the second locking surface 125. For example the first position may be where point P of the second locking surface 125 is in space position P0 and the second assembled position may be where point P is arranged in space position P0' as shown in FIG. 5b.

Accordingly, in any embodiment, the distance D1 between the pivot point, such as the first contact point P1 and a point on the first locking surface 115 may be constant during assembling by means of the folding displacement F.

A shortest distance D1 between a pivot point, such as contact point P1, of the panel being folded, and the first locking surface 115 may be greater than a greatest distance D2 between the said pivot point and the second locking surface 125 as shown in FIG. 5b. Thus, considering point P on the second locking surface 125, which may be any given point of the second locking surface 125, D2 may correspond to radius of curvature R1.

Items

ITEM 1. A mineral-based panel 10, such as a floor panel, comprising a core 3 preferably comprising magnesium oxide, wherein the panel comprises a mechanical locking system 50a, 50b at respective opposite first 11 and second 12 edges, such as long edges, for assembling a first panel 10 in an assembled position with an adjacent similar or essentially identical second panel 20 by means of a folding displacement F of the adjacent panels 10, 20; wherein immediately juxtaposed upper edge portions 111, 121 of the first edge 11 of the first panel 10 and the second edge 22 of the second panel 20 in the assembled position form a vertical plane VP; the first edge 11 comprising a locking strip 116 projecting beyond the vertical plane VP and a locking element 114 projecting from the locking strip 116; the second edge 12 comprising a downwards open locking groove 123 configured to receive the locking element by means of said displacement F for horizontal locking of the panels, wherein a first pair of horizontal locking surfaces comprises a first locking surface 115 provided by the locking element 114 and a second locking surface 125 provided by the locking groove 123.

ITEM 2. The mineral-based panel according to item 1, wherein the locking system 50a, 50b is configured such that there is provided play Da, such as at least zero play, between the first locking surface 115 and the second locking surface 125 during assembling of the first and second panel 10, 20 by means of said displacement F.

ITEM 3. The mineral-based panel according to item 1 or 2, wherein the locking system 50a, 50b is configured such that there is provided play Dt between the first locking surface 115 and the second locking surfaces 125 in the assembled position.

ITEM 4. The mineral-based panel according to any one of the preceding items 1 to 3, wherein one of the first or second edge 11, 12 comprises a locking tongue 122, 118 and the other of the first or second edge comprises a tongue groove 113, 128; wherein the locking system 50a, 50b is configured such that the locking tongue is received in the tongue groove of the second edge by means of a folding displacement F and/or a vertical displacement VF, such as a linear vertical translation, of the adjacent second panel 20, for vertical locking of first edge and the second edge in a horizontal plane.

ITEM 5. The mineral-based panel according to any one of the preceding items 1 to 4, wherein during said assembling, said upper edge portions 111, 121; 131, 141 are simultaneously in contact in a first contact point P1.

ITEM 6. The mineral-based panel according to any one of the preceding items 1 to 5, wherein during said assembling, an upper wall portion 117 of the tongue groove 113 and an upper portion 126 of the locking tongue 122 are in contact in a second contact point P2.

ITEM 7. The mineral-based panel according to any one of the preceding items 1 to 6, wherein a locking angle LA is formed between the first locking surface 115, 145 and a rear surface 16 of the panel 10, the locking angle LA being in the range of 40 to 60 degrees, preferably 45 to 55 degrees, more preferably 48 to 52 degrees, such as 50 degrees.

ITEM 8. The mineral-based panel according to item 7, wherein the locking angle LA is adapted to allow assembling by means of said folding displacement F without flexing or compression of the locking strip 116 and/or the locking element 114.

ITEM 9. The mineral-based panel according to any one of the preceding items 3 to 8, wherein the play Dt between the first locking surface and the second locking surface is in in the range of 0 to 0.1 mm.

ITEM 10. The mineral-based panel according to any one of the preceding items 1 to 9, wherein during assembling of the first and second panel 10, 20 comprises displacement in an assembling direction from a first position wherein the adjacent edges 11, 12; 13; 14 are in contact in point P1, to a second assembled position for horizontal locking of the adjacent edges by means of the first locking surface 115 and the second locking surface 125.

ITEM 11. The mineral-based panel according to any one of the preceding items 1 to 10, wherein a dimension D1 between the first contact point P1 and a point P on the first locking surface 115, such as any point of the first locking surface 115, is constant during assembling of the first and second panel 10, 20, such as during said displacement from first position to second position.

ITEM 12. The mineral-based panel according to any one of the preceding items 1 to 11, wherein a shortest first distance D1 between a pivot point, such as contact point P1, of the panel being displaced, such as folded, and the first locking surface 115 equals or is greater than a greatest second distance D2 between the said pivot point and the second locking surface 125, such as a point P on the second locking surface 125.

ITEM 13. The mineral-based panel according to the preceding item 12, wherein said second distance D2 corresponds to a radius of curvature R1 of a predetermined trajectory Tp of point P from the first position to the second assembled position, preferably said predetermined trajectory Tp forms an arc of a circle having contact point P1 as pivot point and radius of curvature R1, more preferably said arc circle does not intersect the second locking surface 125.

ITEM 14. The mineral-based panel according to any one of the preceding items 1 to 13, further comprising a lower arrangement 6 comprising one or more layers, and an upper arrangement 5 comprising one or more layers.

ITEM 15. The mineral-based panel according to any one of the preceding items 1 to 14, wherein one or more of the core 3, the upper arrangement 5, the lower arrangement comprises a mineral-based layer, wherein the mineral-based layer comprises non-hydraulic cement, preferably magnesium oxide, and optionally magnesium chloride, such as $MgCl_2$ and/or magnesium sulphate, such as $MgSO_4$.

ITEM 16. The mineral-based panel according to any one of the preceding items 1 to 15, wherein the locking system 50a, 50b is formed at least partially in the core 3 and/or in a mineral-based layer of one or more of the lower arrangement 6 and upper arrangement 5.

ITEM 17. The mineral-based panel according to any one of the preceding items 1 to 16, wherein the locking system 50a, 50b is formed at least partially in a mineral-based layer of one or more of the lower arrangement 6 and upper arrangement 5.

ITEM 18. The mineral-based panel according to any one of the preceding items 1 to 17, wherein the second locking surface 125 is configured to extend essentially parallel the first locking surface 115 in assembled position of the panels.

ITEM 19. The mineral-based panel according to any one of the preceding items 1 to 18, wherein Da is in the range of 0-0.1 mm, for example measured transverse the first locking surface 115.

ITEM 20. The mineral-based panel according to any one of the preceding items 3 to 19, wherein said play Dt is provided along a substantial portion of the locking surfaces 115, 125.

ITEM 21. The mineral-based panel according to any one of the preceding items 7 to 20, wherein the locking angle LA is adapted to allow said folding displacement F without abutment of the first locking surface 115 and the second locking surface 125.

ITEM 22. The mineral-based panel according to any one of the preceding items 7 to 21, wherein the locking angle LA is configured such that it is sufficiently low to allow assembling by means of a folding displacement F without overlapping of the second pair of horizontal locking surfaces 125, 115 while the first pair of horizontal locking surfaces 111, 121 are simultaneously in contact.

ITEM 23. The mineral-based panel according to any one of the preceding items 1 to 22, wherein the locking strip 116 is formed in one of a mineral-based layer of the panel or in the core 3 of the panel.

ITEM 24. The mineral-based panel according to any one of the preceding items 1 to 23, wherein the locking element 114 is formed in a mineral based layer of the panel or in the core 3 of the panel.

ITEM 25. The mineral-based panel according to any one of the preceding items 1 to 24, wherein the locking element 114 is formed as an integral part of the locking strip 116.

ITEM 26. The mineral-based panel according to any one of the preceding items 1 to 25, wherein the core comprises an inorganic matrix material, preferably the inorganic matrix material comprises magnesium oxide, cement, such as hydraulic or non-hydraulic cement, or gypsum, preferably in an amount of at least 20 wt %, such as at least 30 wt %.

ITEM 27. The mineral-based panel according to any one of the preceding items 1 to 26, wherein the core 3 comprise 35-55 wt % magnesium oxide and, optionally, 15-35 wt % magnesium chloride and/or magnesium sulphate ITEM 28. A set of mineral-based panels according to any one of the preceding items 1 to 27.

The invention claimed is:

1. A mineral-based panel comprising a core, wherein the panel comprises a mechanical locking system at respective opposite first and second edges, for assembling a first panel in an assembled position with an adjacent similar or essentially identical second panel by means of a folding displacement of the adjacent panels;

wherein immediately juxtaposed upper edge portions of the first edge of the first panel and the second edge of the second panel in the assembled position form a vertical plane;

the first edge comprising a locking strip projecting beyond the vertical plane and a locking element projecting from the locking strip;

the second edge comprising a downwards open locking groove configured to receive the locking element by means of said displacement for horizontal locking of the panels, wherein a first pair of horizontal locking surfaces comprises a first locking surface provided by the locking element and a second locking surface provided by the locking groove;

wherein the locking system is configured such that there is provided play, between the first locking surface and the second locking surface during assembling of the first and second panel by means of said displacement, wherein the mineral-based panel comprises a mineral-based layer comprising at least 20 wt % of a mineral material.

2. The mineral-based panel according to claim 1, wherein the locking system is configured such that there is provided play between the first locking surface and the second locking surfaces in the assembled position.

3. The mineral-based panel according to claim 1, wherein one of the first or second edge comprises a locking tongue and the other of the first or second edge comprises a tongue groove; wherein the locking system is configured such that the locking tongue is received in the tongue groove of the second edge by means of a folding displacement and/or a vertical displacement of the adjacent second panel, for vertical locking of first edge and the second edge in a horizontal plane.

4. The mineral-based panel according to claim 1, wherein during said assembling, said upper edge portions are simultaneously in contact in a first contact point.

5. The mineral-based panel according to claim 1, wherein during said assembling, an upper wall portion of the tongue groove and an upper portion of the locking tongue are in contact in a second contact point.

6. The mineral-based panel according to claim 1, wherein a locking angle is formed between the first locking surface and a rear surface of the panel, the locking angle being in the range of 40 to 60 degrees.

7. The mineral-based panel according to claim 6, wherein the locking angle is adapted to allow assembling by means of said folding displacement without flexing or compression of the locking strip and/or the locking element.

8. The mineral-based panel according to claim 2, wherein the play between the first locking surface and the second locking surface is in in the range of 0 to 0.1 mm.

9. The mineral-based panel according to claim 1, wherein assembling of the first and second panel comprises displacement in an assembling direction from a first position wherein the adjacent edges are in contact in a first point, to a second assembled position for horizontal locking of the adjacent edges by means of the first locking surface and the second locking surface.

10. The mineral-based panel according to claim 9, wherein a dimension between the first contact point and a point on the first locking surface is constant during assembling of the first and second panel.

11. The mineral-based panel according to claim 1, wherein a shortest first distance between a pivot point of the panel being displaced and the first locking surface equals or is greater than a greatest second distance between the pivot point and the second locking surface.

12. The mineral-based panel according to claim 11, wherein said second distance corresponds to a radius of curvature of a predetermined trajectory of point from the first position to the second assembled position.

13. The mineral-based panel according to claim 1, further comprising a lower arrangement comprising one or more layers, and an upper arrangement comprising one or more layers.

14. The mineral-based panel according to claim 13, wherein one or more of the core, the lower arrangement, and the upper arrangement comprises a mineral-based layer, wherein the mineral-based layer comprises inorganic matrix material.

15. The mineral-based panel according to claim 14, wherein the mineral-based layer comprises 35-55 wt % magnesium oxide.

16. The mineral-based panel according to claim 14, wherein the locking system is formed at least partially in said mineral-based layer(s).

17. The mineral-based panel according to claim 14, wherein the locking strip is formed at least partially in said mineral-based layer(s).

18. The mineral-based panel according to claim 1, wherein the core comprises magnesium oxide.

19. The mineral-based panel according to claim 1, wherein the core comprises 35-55 wt % magnesium oxide.

20. The mineral-based panel according to claim 14, wherein the inorganic matrix material comprises magnesium oxide, cement, or gypsum.

21. The mineral-based panel according to claim 14, wherein the mineral-based layer comprises 35-55 wt % magnesium oxide and 15-35 wt % of a material selected from magnesium chloride, magnesium sulphate, or a combination thereof.

* * * * *